United States Patent [19]

Witek

[11] 4,354,768
[45] Oct. 19, 1982

[54] TUBING CONNECTOR

[75] Inventor: Joseph I. Witek, Downers Grove, Ill.

[73] Assignee: Medalist Industries, Inc., Mequon, Wis.

[21] Appl. No.: 259,734

[22] Filed: May 1, 1981

[51] Int. Cl.³ .............................................. F16B 2/16
[52] U.S. Cl. ...................................... 403/3; 403/172; 403/7
[58] Field of Search .................. 403/7, 295, 176, 172, 403/298, 171, 3

[56] References Cited

U.S. PATENT DOCUMENTS

| | | | |
|---|---|---|---|
| 3,532,369 | 10/1970 | Reilly | 403/176 |
| 3,666,298 | 5/1972 | Reilly | 403/298 X |
| 4,023,913 | 5/1977 | Berkowitz | 403/298 X |
| 4,082,470 | 4/1978 | Alberts | 403/7 X |
| 4,111,577 | 9/1978 | Kiyosawa | 403/298 X |

FOREIGN PATENT DOCUMENTS 20648 of 1909 United Kingdom ................ 403/171

Primary Examiner—Andrew V. Kundrat
Attorney, Agent, or Firm—Wheeler, House, Fuller & Hohenfeldt

[57] ABSTRACT

A tubing connector for connecting lengths of round or square tubing includes a base block with an integrally molded connecting arm. Additional connecting arms are connected to the base block by screws which extend through a hollow bore in the connecting arm and an aperture in an end face of the connecting arm. The screws are threadably received in the base block.

3 Claims, 5 Drawing Figures

TUBING CONNECTOR

BACKGROUND OF THE INVENTION

Various tubing connectors have been developed to secure lengths of round or square tubing together either with the tubing axes coincident or at right angles so that the tubing can be assembled to provide a structural framework. The following patents are illustrative of connectors in this category:

| | |
|---|---|
| 3,000,656 | Hollaender |
| 3,642,310 | Hudson |
| 3,645,569 | Reilly |
| 3,711,133 | Werner |
| 3,731,958 | Offenbroich |
| 3,873,220 | Kashiwabara |
| 4,023,913 | Berkowitz |
| 4,076,429 | Berkowitz |
| 4,111,577 | Kiyosawa |
| 2,006,297 | Kyburz (U.K.) |

Typically the base block of the various tubing connectors of the prior art are cubical, with connecting arms projecting from one or more faces. However, it is not desirable to have connecting arms projecting from all six faces if only two or three of the connecting arms are going to be used at a particular joint. Accordingly, if the connectors are molded, molds must be made for a base block with various numbers of projecting connecting arms. U.S. Pat. No. 3,642,310 uses clips to fasten tubing lengths to a right angle joint and hence does not require a variety of molds. The clips, however, detract from the appearance of the joint.

SUMMARY OF THE INVENTION

The invention provides a tubing connector assembly base block having a single projecting joining member or connecting arm. The base block is cubical with opposed faces. Additional connecting arms can be added as desired. Each additional connecting arm has a hollow bore terminating in a web which forms an end face. A screw extending through an aperture in the web is threadably received in the base block to secure the connecting arm to the base block. The bore in the connecting arm permits access to the screw head for tightening and untightening the screw. Up to five additional connecting arms can be added to a base block. Hence a complete tubing connector assembly can be provided using only two molds, one mold for the base block and integral first arm and the other mold for separate connecting arms.

Further objects, advantages and features of the invention will become apparent from the disclosure.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
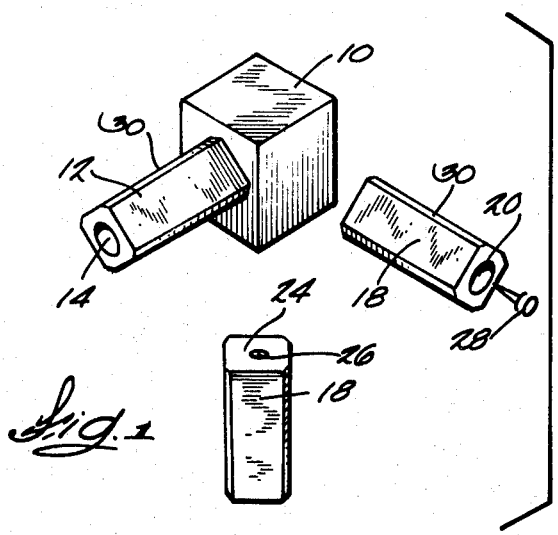
FIG. 1 is an exploded perspective view of the tubing connector of the invention.
Figure 2:
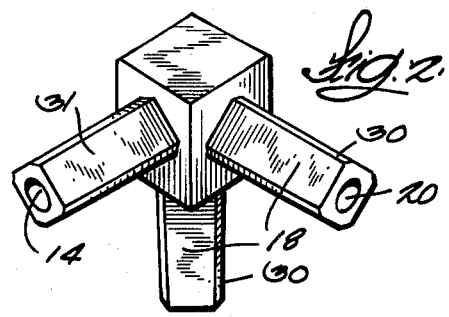
FIG. 2 is a perspective view of the parts shown in FIG. 1 assembled.
Figure 3:
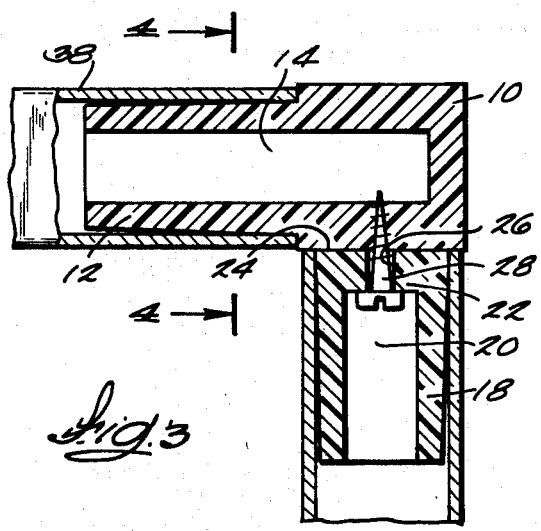
FIG. 3 is an enlarged sectional view of the tubing connector.

In the drawings, FIG. 1 shows a tubing connector base block 10 with an integrally formed first joining member or connecting arm 12 which has a hollow bore 14. As shown in FIG. 3, the bore 14 extends into the base block 10. The base block 10 is cubical in shape with parallel opposed faces. It is desirably formed of a plastic into which threads can be formed with a self tapping screw.

A separate connecting arm, joining member or post 18, as shown in FIG. 1, includes a bore 20 and a web portion 22 which forms an end face 24. The web portion has a central aperture 26. As shown in FIG. 3, a self tapping screw 28 is extended through the aperture and threaded into the base block 10 to anchor the second joining member or connecting arm 18 to the base block. The bore 20 permits access to the screw head for tightening the screw. Other similar connecting arms can be affixed to any of the bases as desired. The tubing connector of the invention requires only two molds to provide a connector with connecting arms extending from up to six faces. One mold can be employed for the base block and integral connecting arm and the other mold for additional separate connecting arms. Nine different configurations are possible. Base blocks of other than cubical shape are within the purview of the invention.

Figure 4:
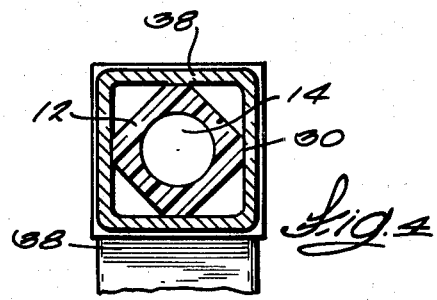
FIG. 4 is a view along line 4—4 of FIG. 3.
Figure 5:
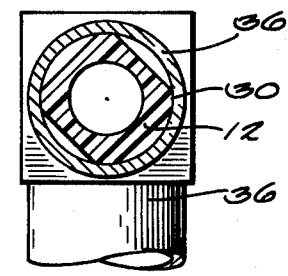
FIG. 5 is a view similar to FIG. 4 in which round tubing rather than square tubing is connected to the tubing connector.

The connecting arms are provided with flats 30 at the corners. The flats 30 are in planes at right angles with the flats of adjacent corners and parallel to opposed flats. The flats are also at 45 degrees with respect to the faces 31. Hence with square tubing the tubing walls are oriented parallel to corresponding faces of the base block. The flats 30 enable assembly of either round 36 or square 38 tubing, as shown in FIGS. 4 and 5. A slight taper of the connecting arm 18, as shown in FIG. 3, facilitates insertion in the tubing and a press fit to secure the tubing on the connecting arms without any fasteners being required. The taper also compensates for the varying tolerances of tubing. With the use of plastic material, the arms 18 are desirably sized so that the tubing ends shave small amounts of plastic during assembly to insure a tight fit.

Desirably the tubing connector system of the invention is manufactured to fit several different sizes of tubing. Thus a base block with integral connecting arms of one size can be used with connecting arms of different sizes to connect tubing of various diameters at a common junction. The connecting arrangement conceals the mounting screws, which is more suitable than the arrangement shown in U.S. Pat. No. 4,238,117.

I claim:

1. A tubing connector comprising a base block formed from a molded plastic material which can threadably receive a self tapping screw and having six finished connecting faces with the faces oriented to form a cube, a first joining member having a root integrally formed with said base block and extending from one of said faces and the longitudinal axis of said first joining member extending perpendicular to the face of said base block from which it extends, said first joining member having a central bore, a second joining member having a bore, a web at one end of said second joining member and forming the bottom of said bore and a planar end face, and self tapping fastening means extending through said web and received in said base block to secure said end face of the second joining member in abutment with a face on said base block to provide a rigid assembly of said second joining member with said base block, and wherein said joining members have exterior surfaces sized to receive and interconnect tubular members to form structures and the first joining member central bore extends uniformly into said base block and being of a diameter such that said self tapping fastening means from said second joining member penetrates into said central bore yet has sufficient purchase with the block material to retain said second joining new member.

2. The tubing connector of claim 1 in which said fastening member comprises a screw which is threaded into said base block.

3. A tubing connector in accordance with claim 1 wherein said second joining member is sized to interfit with a different diameter tubing than said first joining member.